United States Patent [19]

Mizutani et al.

[11] Patent Number: 4,539,447
[45] Date of Patent: Sep. 3, 1985

[54] INDICATOR SWITCH MECHANISM FOR AUTOMOBILE TRANSFER GEAR UNITS

[75] Inventors: Hiroyuki Mizutani, Chiryu; Kunihiko Ochi, Anjo, both of Japan

[73] Assignee: Aisin Seiki Kabushiki Kaisha, Kariya City, Japan

[21] Appl. No.: 536,494

[22] Filed: Sep. 28, 1983

[30] Foreign Application Priority Data

Oct. 5, 1982 [JP] Japan ................................ 57-174987
Nov. 9, 1982 [JP] Japan ................................ 57-197364

[51] Int. Cl.³ .............................................. H01H 3/16
[52] U.S. Cl. .................................. 200/61.91; 74/477;
200/DIG. 29
[58] Field of Search ............ 74/477; 200/61.28, 61.91,
200/61.88, DIG. 29

[56] References Cited

U.S. PATENT DOCUMENTS 4,290,318 9/1981 Ookubo et al. ....................... 74/477
4,305,309 12/1981 Ookubo et al. ....................... 74/477
4,415,786 11/1983 Takada et al. .................... 200/61.91

Primary Examiner—A. D. Pellinen
Assistant Examiner—Morris Ginsburg
Attorney, Agent, or Firm—Burns, Doane, Swecker & Mathis

[57] ABSTRACT

A transfer gear unit for use in an automobile comprises a first changeover device for selecting one of a two-wheel drive mode and a four-wheel drive mode at a time, a second changeover device for selecting one of a high-speed gear train, a neutral gear train and a low-speed gear train at a time, a first fork shaft selectively movable into a two-wheel drive position and a four-wheel drive position for actuating the first changeover device, a second fork shaft selectively movable into a high-speed gear position, a neutral gear position and a low-speed gear position for actuating the second changeover device, and a switch mechanism for indicating the four-wheel drive mode. The switch mechanism includes a switch and switch actuator means operable in response to operation of the first and second fork shafts for actuating the switch when the first fork shaft is in the four-wheel drive position and the second fork shaft is in the high-speed gear position or the low-speed gear position.

8 Claims, 27 Drawing Figures

4,539,447

INDICATOR SWITCH MECHANISM FOR AUTOMOBILE TRANSFER GEAR UNITS

BACKGROUND OF THE INVENTION

The present invention relates to a switch mechanism for indicating a four-wheel drive mode of operation of an automobile transfer gear unit which is selectively actuatable in a two-wheel or four-wheel drive mode in one of high-speed, neutral, and low-speed gear positions.

There has been known a switch mechanism for energizing an indicator lamp when an automobile is in a four-wheel drive mode. The known switch mechanism is actuatable by a changeover fork shaft shiftable in a transfer gear unit to select a two-wheel drive mode or a four-wheel drive mode, there being also a second changeover fork shaft for selecting either a high-speed, neutral, or low-speed gear train. With the prior switch mechanism, the indicator lamp remains energized as long as the changeover fork shaft is in a four-wheel drive position irrespectively of whether the high-speed, neutral, or low-speed gear train is selected by the second changeover fork shaft. Therefore, the conventional switch mechanism is disadvantageous in that, while in the four-wheel drive mode, the indicator lamp is lighted even when the gear is in the neutral position and thus no engine power is transmitted to the four wheels.

One solution to this problem is to add a second switch mechanism actuatable in response to operation of the second changeover fork shaft for energizing the indicator lamp only when the second changeover fork shaft is in the high-speed or low-speed gear position while the four-wheel drive mode is selected by the first changeover fork shaft. This arrangement, however, requires two switch mechanisms, and necessitates an electric control circuit for processing signals from the two switch mechanisms.

SUMMARY OF THE INVENTION

Accordingly, it is an object of the present invention to provide a single switch mechanism for indicating a four-wheel drive mode of an automobile only when either a high-speed or a low-speed gear train is completed.

According to the present invention, there is provided a transfer gear unit for use in an automobile comprising a first changeover device for selecting one of a two-wheel drive mode and a four-wheel drive mode at a time, a second changeover device for selecting one of a high-speed gear train, a neutral gear train and a low-speed gear train at a time, a first fork shaft selectively movable into a two-wheel drive position and a four-wheel drive position for actuating the first changeover device, a second fork shaft selectively movable into a high-speed gear position, a neutral gear position and a low-speed gear position for actuating the second changeover device, and a switch mechanism for indicating the four-wheel drive mode, the switch mechanism including a switch and switch actuator means operable in response to operation of the first and second fork shafts for actuating the switch when the first fork shaft is in the four-wheel drive position and the second fork shaft is in the high-speed gear position or the low-speed gear position.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
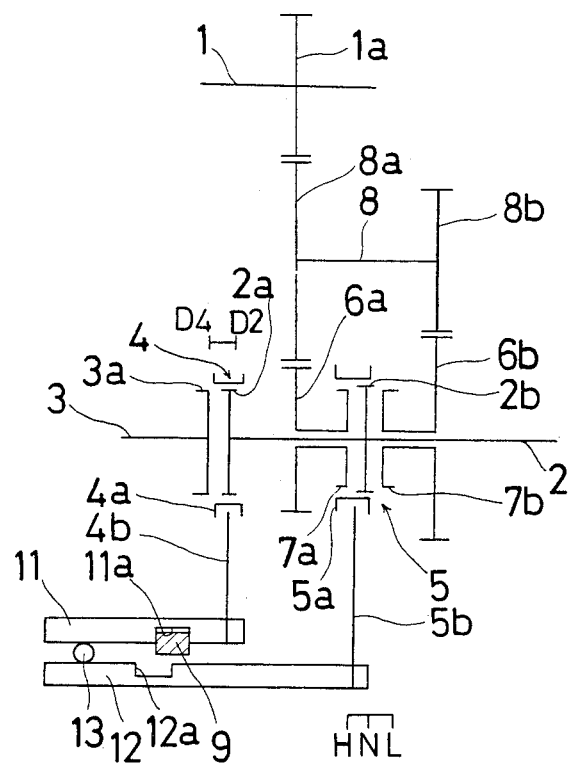
FIG. 1 is a schematic diagram of an automobile transfer gear unit.

FIG. 1 schematically shows an automobile transfer gear unit in which a switch mechanism of the present invention can be incorporated.

The transfer gear unit comprises an input shaft 1 coupled to an automobile engine, an output shaft 2 drivingly coupled to automobile rear wheels (or front wheels), and another output shaft 3 drivingly coupled to automobile front wheels (or rear wheels). The output shafts 2, 3 extend in coaxial relation to each other and have on their confronting ends hubs 2a, 3a, respectively, each having gear teeth around its outer circumferential edge. A sleeve 4a having internal gear teeth is axially slidable into selective meshing engagement with the teeth on the hub 2a or 3a. The hubs 2a, 3a and the sleeve 4a jointly constitute a first changeover device 4 for selecting a two-wheel drive mode or a four-wheel drive mode.

The output shaft 2 also has another hub 2b axially spaced from the hub 2a and having gear teeth around its outer circumferential edge. High- and low-speed gears 6a, 6b are coaxially disposed one on each side of the hub 2b and have hubs 7a, 7b, respectively, adjacent to the hub 2b, the hubs 7a, 7b having gear teeth on their outer circumferential edges. A sleeve 5a having internal gear teeth is axially slidable into selective meshing engagement with the hub 7a or 7b. The high- and low-speed gears 6a, 6b and the sleeve 5a jointly constitute a second changeover device 5 for selectively completing a high-speed gear train, a neutral gear train, or a low-speed gear train. The transfer gear unit also includes an intermediate gear shaft 8 having on opposite ends intermediate gears 8a, 8b in driving mesh with the high- and low-speed gears 6a, 6b, respectively. The input shaft 1 supports thereon a drive gear 1a held in driving mesh with the intermediate gear 8a. Thus, while the engine is in operation, the high- and low-speed gears 6a, 6b are rotated at all times by the intermediate gears 8a, 8b, respectively, which are rotated by the drive gear 1a on the input shaft 1.

The transfer gear unit also has a pair of first and second axially movable fork shafts 11, 12 having recesses 11a, 12a, respectively, defined in confronting edges thereof, and a shift lever 9 selectively engageable in one of the recesses 11a, 12a at a time for axially shifting the fork shaft 11 or 12. The fork shafts 11, 12 support thereon forks 4b, 5b, respectively, held in engagement with the sleeves 4a, 5a, respectively. The fork shaft 11 is axially movable by the shift lever 9 fitted in the recess 11a to enable the fork 4b to displace the sleeve 4a axially between a two-wheel drive position D2 in which the sleeve 4a meshes with the hub 2a only and a four-wheel drive position D4 in which the sleeve 4a meshes with both the hub 2a and the hub 3a. The fork shaft 12 is axially movable by the shift lever 9 fitted in the recess 12a to enable the fork 5b to displace the sleeve 5a between a high-speed gear position H in which the sleeve 5a meshes with both the hub 7a and the hub 2b, a neutral position in which the sleeve 5a meshes with the hub 2b only, and a low-speed gear position in which the sleeve 5a meshes with both the hub 2b and the hub 7b. Consequently, the fork shaft 11 is axially moved by the shift lever 9 for selecting a two-wheel drive mode or a four-wheel drive mode, and the fork shaft 12 is axially moved by the shift lever 9 for selecting a high-speed, neutral, or low-speed gear train. The fork shafts 11, 12 are only selectively movable such that while one of them is actuated, the other is locked by a locking means (not shown) against movement.

Operation of the transfer gear unit thus constructed is as follows: In the position illustrated in FIG. 1, the fork shaft 11 and hence the sleeve 4a are in the two-wheel drive position D2, and the fork shaft 12 and hence the sleeve 5a are in the high-speed gear position H. Drive power from the input shaft 1 is therefore transmitted from the drive gear 1a through the intermediate gear 8a, the high-speed gear 6a, the sleeve 5a, and the hub 2b to the output shaft 2. Since the sleeve 4a engages the hub 2a only, no drive power is transmitted to the output shaft 3. The transfer gear unit is now in the high-speed gear position in the two-wheel drive mode. At this time, the shift lever 9 is positioned in H2 in the shift pattern of FIG. 1A.

Figure 1A:
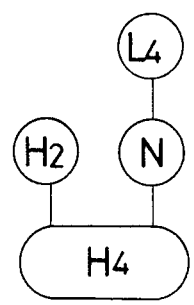
FIG. 1A is a diagram showing gear shift positions of a shift lever of the transfer gear unit.

When the shift lever 9 as it is fitted in the recess 11a is moved to the left from the position of FIG. 1, the shift lever 9 is positioned in H4 in FIG. 1A and the fork shaft 11 and hence the sleeve 4a are in the four-wheel drive position D4. At this time, the recess 11a is aligned with the recess 12a. The drive power can now be transmitted also to the output shaft 3. The transfer gear unit is in the high-speed gear position in the four-wheel drive mode.

When the shift lever 9 is then moved out of the recess 11a into the recess 12a and shifted to the right (FIG. 1) into the position N in FIG. 1A, the fork shaft 12 and hence the sleeve 5a are displaced to the neutral gear position N in FIG. 1. The sleeve 5a now engages the hub 2a only, and the power flow from the input shaft 1 to the output shafts 2, 3 is cut off. The transfer gear unit is now in the neutral gear position.

When the shift lever 9 is shifted rightward into the position L4 in FIG. 1A, the sleeve 5a is brought into the low-speed gear position L (FIG. 1) in which the hubs 2b, 7b are interconnected by the sleeve 5a. Now, the drive power from the input shaft 1 can be transmitted through the intermediate gear shaft 8., the intermediate gear 8b, the low-speed gear 6b, the hub 7b, and the hub 7b to the output shaft 2. The drive power is also transmitted to the output shaft 3 as the hubs 2a, 3a are coupled by the sleeve 4a at this time. The transfer gear unit is in the low-speed gear position in the four-wheel drive mode.

The sleeves 4a, 5a of the first and second changeover devices 4, 5 can be retained in the selected positions by attaching suitable detent means (not shown) to the fork shafts 11, 12.

Figure 2:
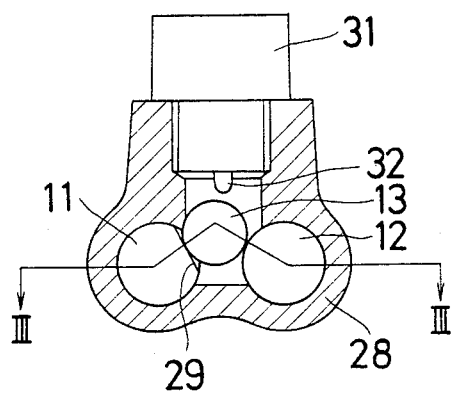
FIG. 2 is a cross-sectional view of a switch mechanism according to the present invention, the switch mechanism being positioned when the transfer gear unit is in a two-wheel drive mode.
Figure 3:
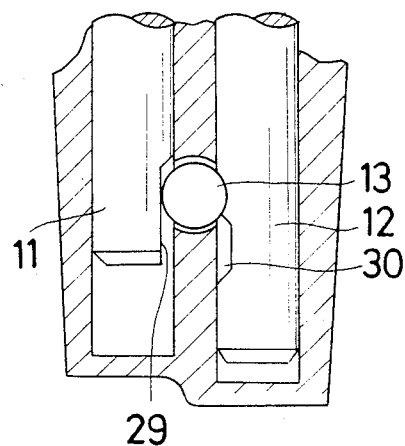
FIG. 3 is a cross-sectional view taken along line III—III of FIG. 2.

A switch mechanism of the present invention incorporated in the transfer gear unit will now be described with reference to FIGS. 2 and 3. When the transfer gear unit is in the two-wheel drive mode in the high-speed gear position, the fork shafts 11, 12 are positioned as shown in FIGS. 2 and 3. The fork shafts 11, 12 are slidably housed in a casing 28 and have recesses 29, 30. A ball 13 serving as a switch actuator is movably disposed in the casing 28 between the fork shafts 11, 12 so as to be selectively receivable in the recesses 29, 30. A switch 31 is threadedly mounted in the casing 28 and includes a pusher rod 32 connected to a movable contact therein and actuatable by the ball 13, the switch 31 being electrically connected to an indicator lamp (not shown). In the illustrated position, the ball 13 is received in the recess 29 in the fork shaft 11, but not in the recess 30 in the fork shaft 12. The pusher rod 32 is not engaged by the ball 13 and hence in an inoperative position in which the indicator lamp is de-energized.

Figure 4:
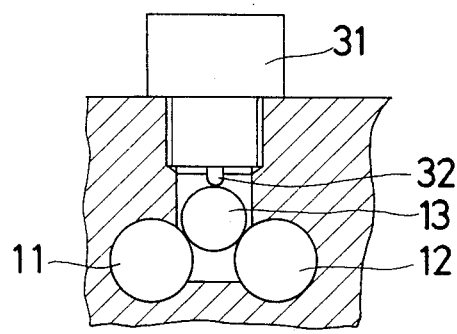
FIG. 4 is a fragmentary cross-sectional view of the switch mechanism as it is positioned when the transfer gear unit is in a high-speed or a low-speed gear position in a four-wheel drive mode.

When the fork shaft 11 is axially displaced into the four-wheel drive position D4, as shown in FIGS. 4 through 7, the ball 13 is lifted out of the recess 29. In this position, since the fork shaft 12 remains in the solid-line position of FIG. 5, the ball 13 is raised out of both the recesses 29, 30 into pushing engagement with the pusher rod 32 of the switch 31 as shown in FIG. 4, whereupon the switch 31 is actuated to energize the indicator lamp.

Figure 6:
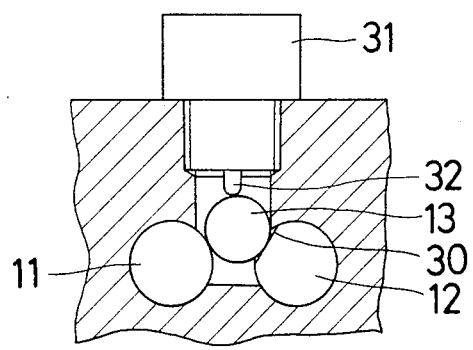
FIGS. 6 and 7 are views similar to FIGS. 4 and 5, respectively, illustrating the position of the switch mechanism when the transfer gear unit is in a neutral gear position in the four-wheel drive mode.
Figure 7:
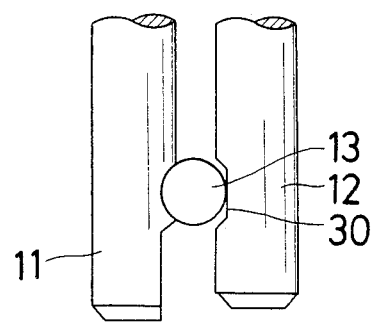

When the fork shaft 12 is further axially moved to the neutral position N, the ball 13 drops into the recess 30 in the fork shaft 12 as shown in FIGS. 6 and 7, thereby releasing the pusher rod 32. The switch 31 is now inactivated to turn off the indicator lamp.

Figure 5:
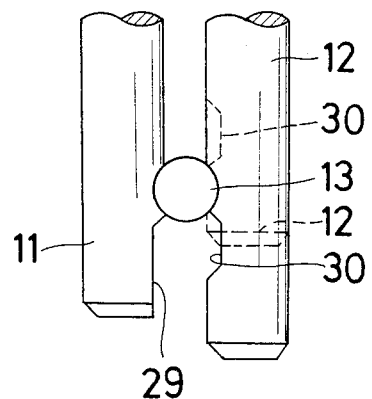
FIG. 5 is a fragmentary plan view of the switch mechanism, showing the position of FIG. 4.

When the fork shaft 12 is axially moved again into the low-speed gear position L as shown by the broken lines in FIG. 5, the ball 13 is forced out of the recess 30 into pushing engagement with the pusher rod 32 as illustrated in FIG. 4. The switch 31 is actuated again to turn on the indicator lamp.

Accordingly, the indicator lamp is energized only when the transfer gear unit is in the four-wheel drive mode in the high- or low-speed gear position.

Figure 8:
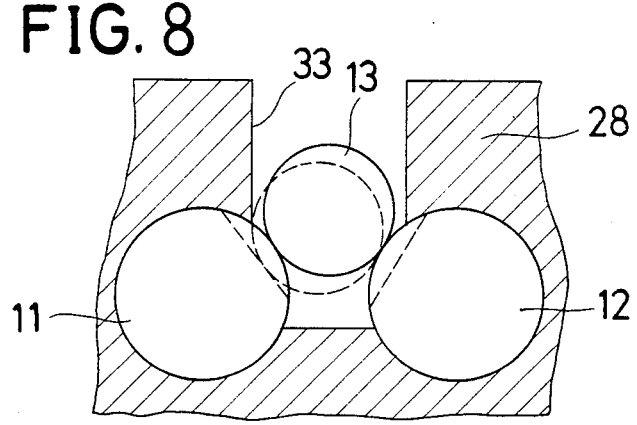
FIG. 8 is an enlarged cross-sectional view of a portion of FIG. 4.
Figure 9:
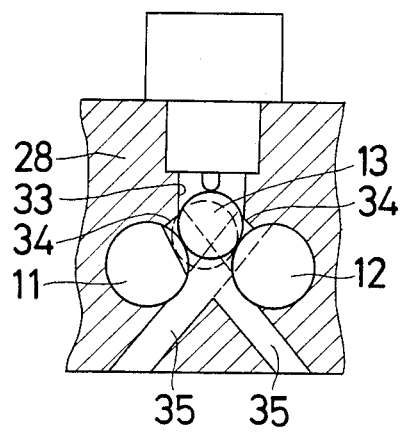
FIGS. 9 through 13 are fragmentary cross-sectional views of modified switch mechanisms according to the present invention.
Figure 10:
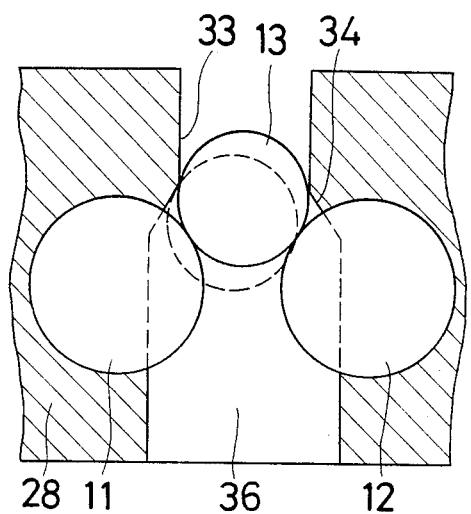

Since the ball 13 is moved obliquely downwardly or upwardly into or out of the recesses 29, 30 when the fork shafts 11, 12 are axially moved, it is necessary that the ball 13 be of a smaller diameter than that of a hole 33 (FIG. 8) in which the ball 13 is disposed, thereby providing a gap or clearance around the ball 13 to allow the latter to move therein. To make the clearance between the ball 13 and the wall of the casing 28 that defines the hole 33 as small as possible and also to assure movement of the ball 13, a lower edge of the hole 33 may have bevelled surfaces 34 as illustrated in FIGS. 9 and 10. The bevelled surfaces 34 may be defined by forming crossing holes 35 in the casing 28 as shown in FIG. 9, or forming a hole 36 of a relatively large diameter as shown in FIG. 10.

Figure 11:
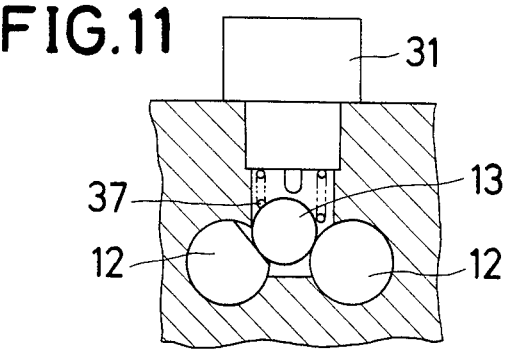

. FIG. 11 shows another modification in which a compression coil spring 37 is positioned between the switch 31 and the ball 13 for preventing unwanted upward movement of the ball 13 toward the switch 31.

Figure 12:
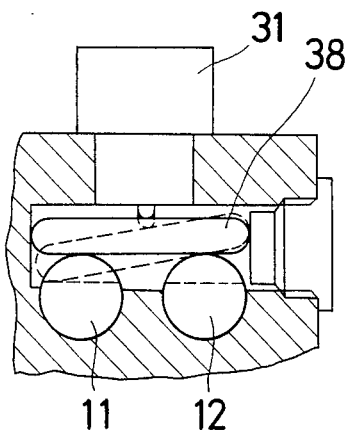

According. to still another modification shown in FIG. 12, a horizontal pin 38 is transversely disposed on the fork shafts 11, 12. The pin 38 is swingably movable in response to axial movement of the fork shafts 11, 12, between a solid-line position in which the the pin 38 is out of the recesses in the fork shafts 11, 12 to thereby actuate switch 31, a dotted-line inclined position in which the pin 38 is received in the recess in the fork shaft 11 to thereby turn off the switch 31, and another inclined position (not shown) in which the pin 38 is received in the recess in the fork shaft 12 to thereby turn off the switch 31.

Figure 13:
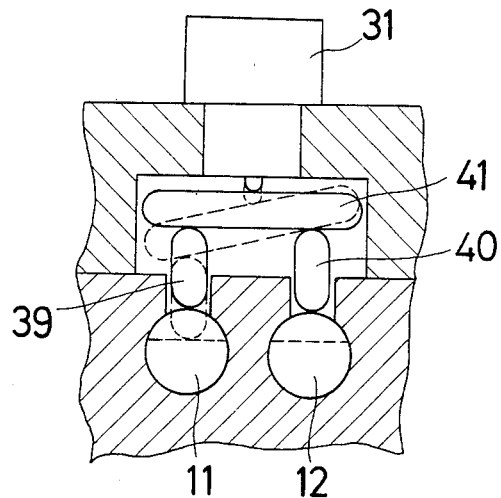

FIG. 13 illustrates a still further modification in which the switch 31 is actuatable by a horizontal pin 41 movable by the fork shafts 11, 12 through vertical pins 39, 40 resting on the fork shafts 11, 12, respectively. When both the vertical pins 39, 40 are not received in the recesses in the fork shafts 11, 12, the horizontal pin 41 is positioned as indicated by the solid line and actuates the switch 31. When one of the vertical pins 39, 40 is received in the corresponding recess in the fork shaft 11 or 12, the horizontal pin 41 is obliquely displaced downwardly to turn off the switch 31. For example, the horizontal pin 41 assumes the dotted-line position when the pin 39 is received in the recess in the fork shaft 11.

Figure 14:
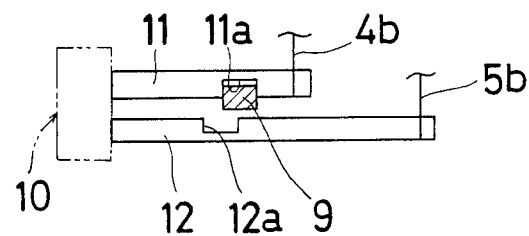
FIG. 14 is a schematic diagram illustrative of a switch mechanism according to another embodiment of the present invention.

FIG. 14 illustrates a switch mechanism 10 according to another embodiment of the present invention, the switch mechanism 10 operatively coacting with the fork shafts 11, 12 associated with the transfer gear unit as shown in FIG. 1.

Figure 15:
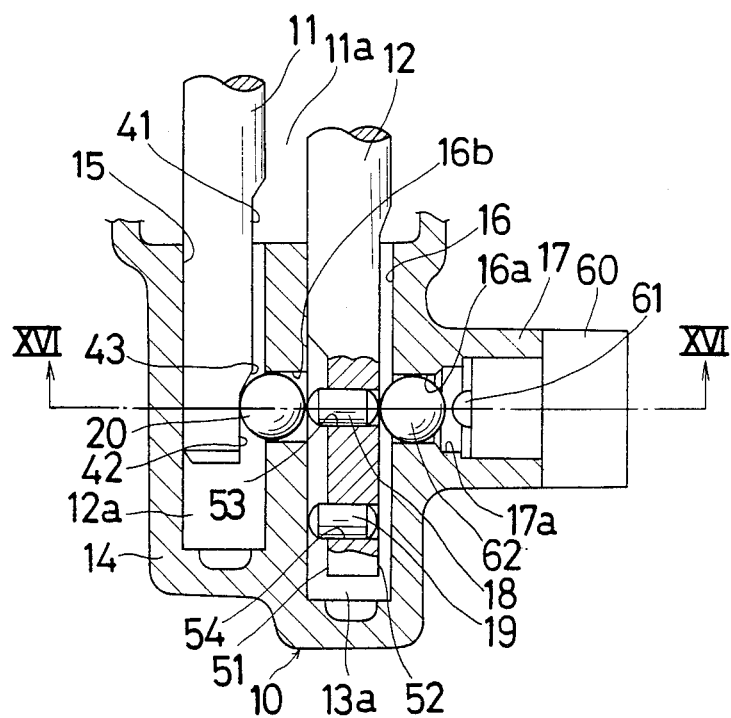
FIG. 15 is a cross-sectional view of the switch mechanism of FIG. 14, the switch mechanism being positioned when the transfer gear unit is in a high-speed gear position in a two-wheel drive mode.
Figure 16:
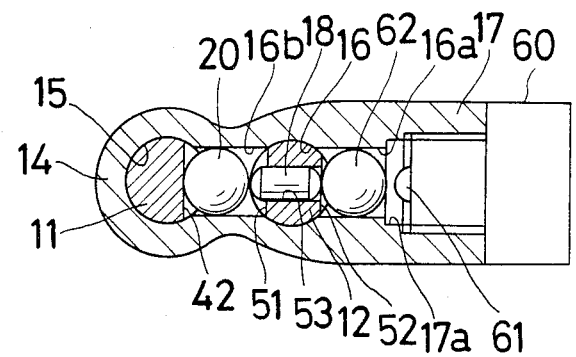
FIG. 16 is a cross-sectional view taken along line XVI—XVI of FIG. 15.

As shown in FIGS. 15 and 16, the switch mechanism 10 includes a casing 14 having two adjacent parallel bores 15, 16 in which there are slidably received ends of the fork shafts 11, 12, respectively. The casing 14 has a pair of transverse coaxial holes 16a, 16b extending substantially perpendicularly to the bores 15, 16 in communication therewith. The casing 14 has an integral lateral boss 17 having a bore 17a defined therein coaxially with the hole 16a in communication therewith. A switch 60 is threaded in the bore 17a, the switch 60 having a pusher rod 61 coupled to a movable contact therein. When the pusher rod 61 is pushed, the switch 60 can be actuated to energize an indicator lamp electrically coupled therewith.

A ball 20 serving as a first switch actuator is slidably disposed in the hole 16b. Another ball 62 is slidably disposed in the hole 16a for pushing the pusher rod 61 of the switch 60.

The first fork shaft 11 has first and second flat steps 41, 42 facing the hole 16b and interconnected by a slant surface 43. The first flat step 41 faces the hole 16b when the fork shaft 11 is in the four-wheel drive position D4 (FIG. 1). The second flat step 42 faces the hole 16b when the fork shaft 11 is in the two-wheel drive position D2.

The second fork shaft 12 has opposite recesses 51, 52 opening toward the holes 16b, 16a, respectively. The fork shaft 12 also has axially spaced lateral through holes 53, 54 defined in the recesses 51, 52 and having axes extending parallel to the axes of the holes 16a, 16b. Pins 18, 19 are slidably disposed in the holes 53, 54, respectively, each serving as a second switch actuator. The hole 53 can be held in substantial axial alignment with the holes 16a, 16b when the fork shaft 12 is in the high-speed gear position H, and the hole 54 can be held in substantial axial alignment with the holes 16a, 16b when the fork shaft 12 is in the low-speed gear position L.

Operation of the switch mechanism of the foregoing construction will be described. When the transfer gear unit is in the high-speed gear position in the two-wheel drive mode as shown in FIG. 1, the fork shaft 11 is in the two-wheel drive position D2 and the fork shaft 12 is in the high-speed gear position H with the ball 20 held against the second step 42, as illustrated in FIGS. 15 and 16. The pusher rod 61 of the switch 60 projects under the force of a spring (not shown) disposed in the switch 60, which remains turned off.

Figure 17:
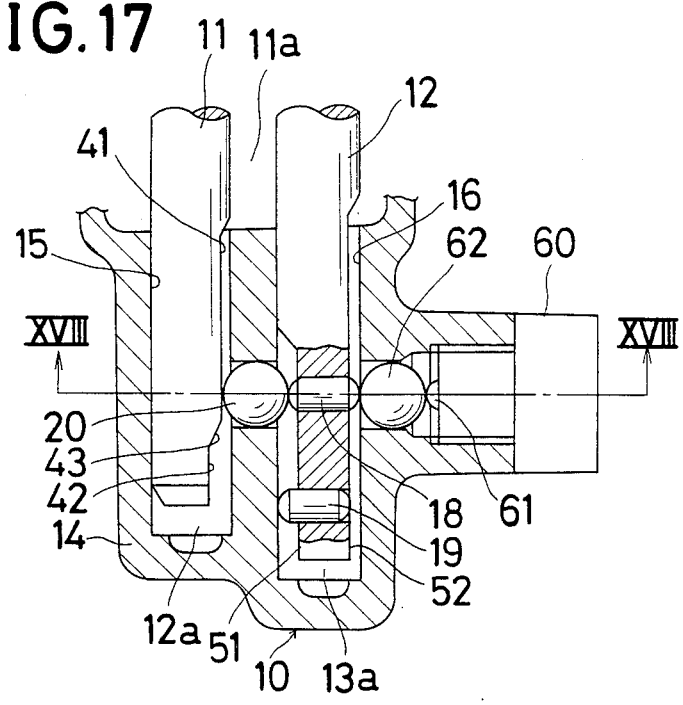
FIG. 17 is a cross-sectional view of the switch mechanism which is positioned when the transfer gear unit is in the high-speed gear position in a four-wheel drive mode.
Figure 18:
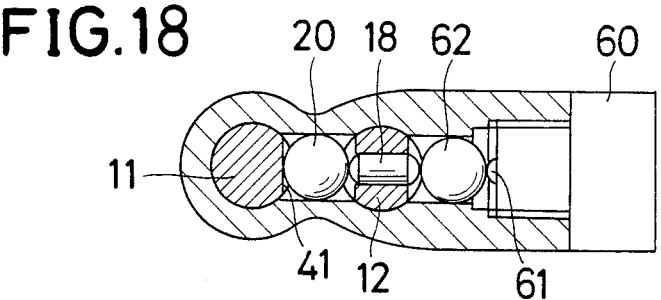
FIG. 18 is a cross-sectional view taken along line XVIII—XVIII of FIG. 17.

When the fork shaft 11 is axially moved into the four-wheel drive position D4, as illustrated in FIGS. 17 and 18, so that the transfer gear unit is in the high-speed gear position in the four-wheel drive mode, the ball 20 is raised from the second step 42 onto the first step 41 to displace the pin 18 to the right. The ball 62 now pushes the pusher rod 61 to turn on the switch 60. At this time, the interiors 12a, 13a of the bores 15, 16 are held in communications with the interior 11a of the casing 14 through the first step 41 and the second recess 52.

Figure 19:
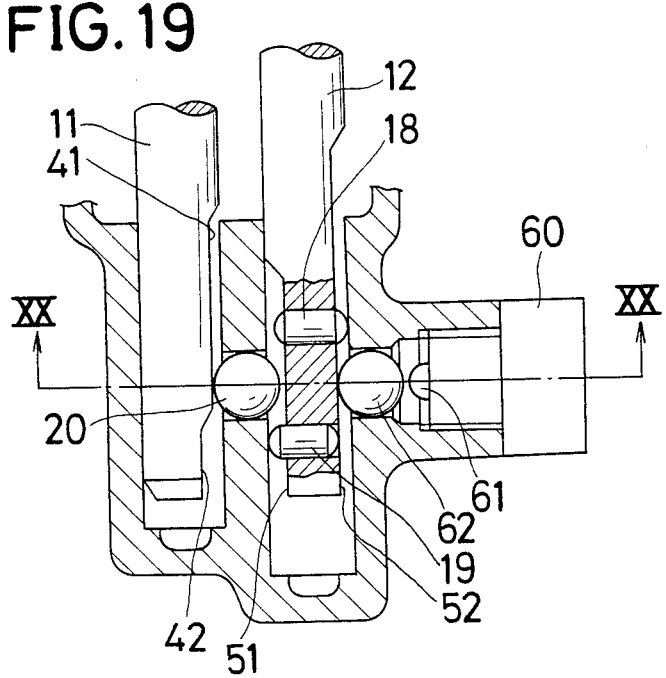
FIG. 19 is a cross-sectional view of the switch mechanism as positioned when the transfer gear unit is in a neutral gear position in the four-wheel drive mode.
Figure 20:
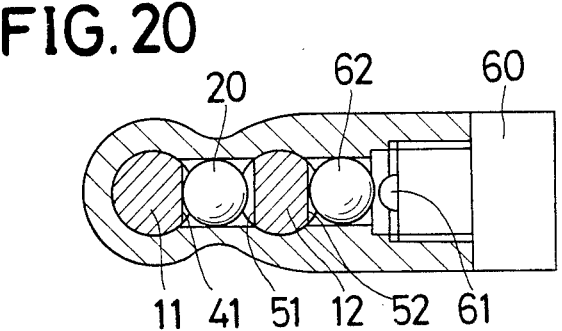
FIG. 20 is a cross-sectional view taken along line XX—XX of FIG. 19.

When the fork shaft 12 is displaced to the neutral gear position N to bring the transfer gear unit into the neutral gear mode, as shown in FIGS. 19 and 20, the pin 18 is shifted out of contact with the balls 20, 62 and the ball 62 can be moved to the left into engagement with the bottom of the recess 52. The pusher rod 61 is now forced to project, turning off the switch 60.

Figure 22:
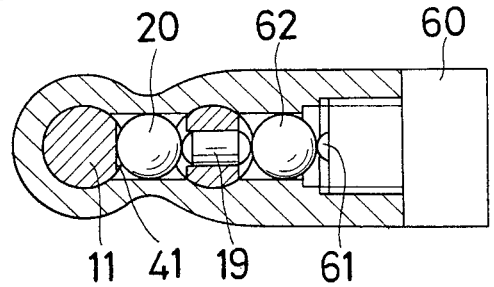
FIG. 22 is a cross-sectional view taken along line XXII—XXII of FIG. 21.
Figure 21:
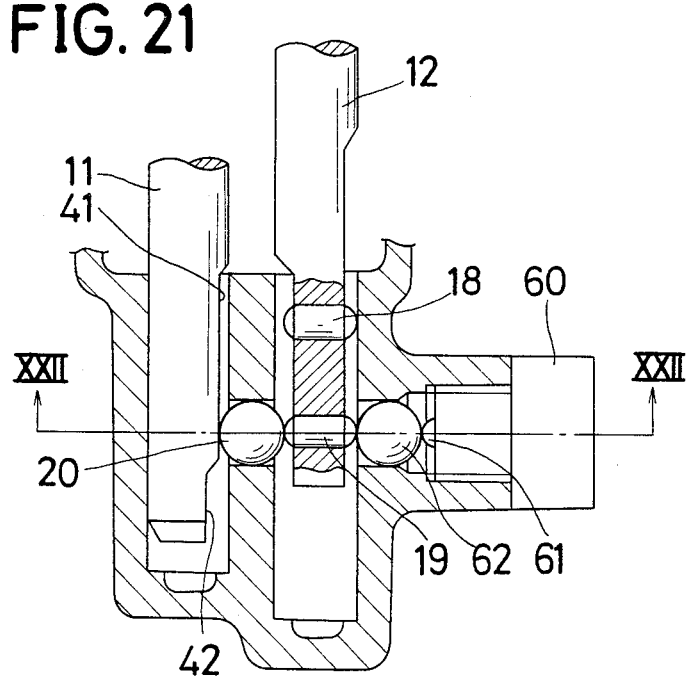
FIG. 21 is a cross-sectional view of the switch mechanism as positioned when the transfer gear unit is in a low-speed gear position in the four-wheel drive mode.

When the fork shaft 12 is further moved into the low-speed gear position L, as shown in FIGS. 21 and 22, the transfer gear unit is in the low-speed gear position in the four-wheel drive mode. The pin 19 is now positioned between the balls 20, 62, thereby forcing the ball 62 to push the pusher rod 61 turning on the switch 60.

The foregoing shifting operation is effected by moving the shift lever 9 along the shift pattern of FIG. 1A from H2 to H4 to N to L4. The switch mechanism operates in the same way as described above when the shift lever 9 follows the shift pattern from L4 to N to H4 to H2.

Accordingly, as long as the fork shaft 11 is in the rour-wheel drive position and the fork shaft 12 is in the high-speed gear position H or the low-speed gear position L, the ball 20 is pushed by the pin 18 or 19 to turn on the switch 60.

Figure 23:
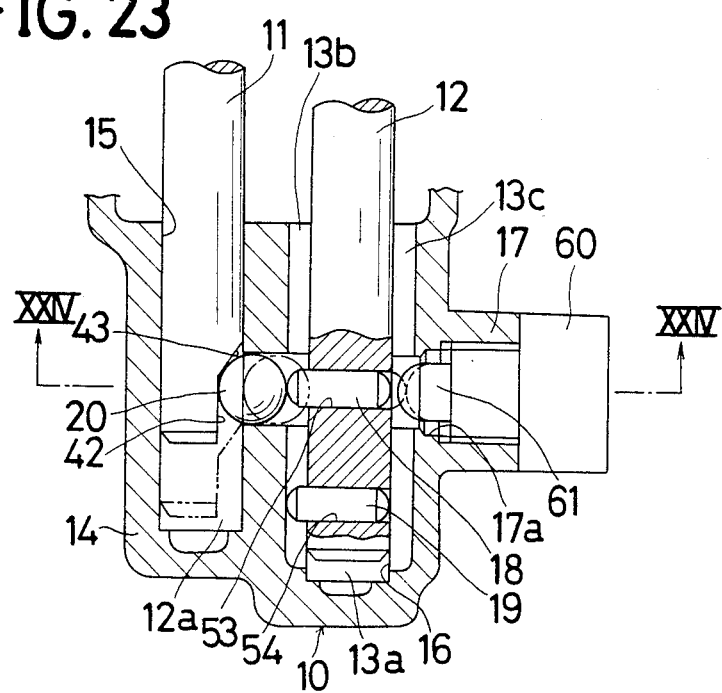
FIG. 23 is a cross-sectional view of a switch mechanism according to a modification.
Figure 24:
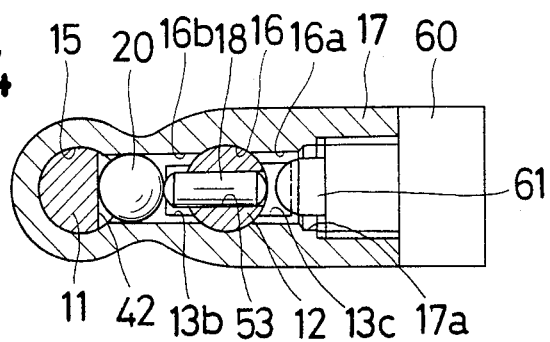
FIG. 24 is a cross-sectional view taken along line XXIV—XXIV of FIG. 23.

As illustrated in FIGS. 23 and 24, the ball 62 may be dispensed with, and the switch 60 may have a longer pusher rod 61 for direct contact with the pin 18. The first step 41 may also be dispensed with, and the ball 20 may be brought into contact with an outer peripheral surface of the fork shaft 11 when the latter is in the four-wheel drive position D4. The recesses 51, 52 in the fork shaft 12 may be dispensed with, and the bore 16 may have grooves 13b, 13c for accommodating the ends of the pins 18, 19.

Figure 25:
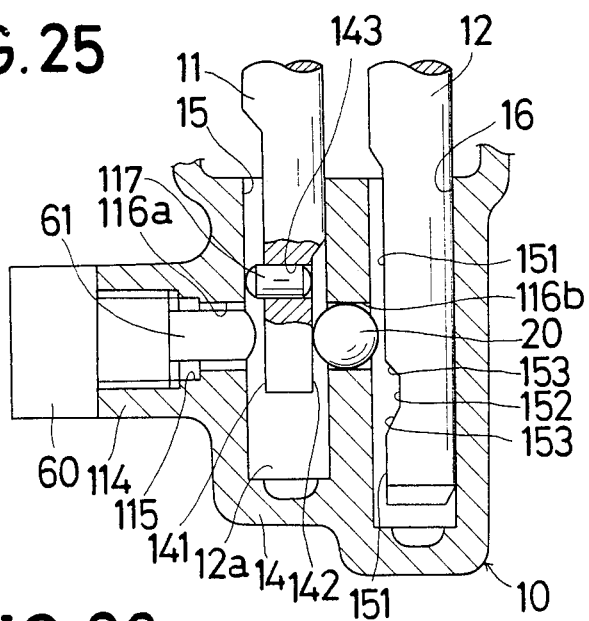
FIG. 25 is a cross-sectional view of a switch mechanism according to a still further embodiment of the present invention.

FIG. 25 shows a switch mechanism according to a still further embodiment. The casing 14 has an integral boss 114 located adjacent to a first fork shaft 11 and having a bore 115 in which a switch 60 having a pusher rod 61 is threadedly received. The casing 14 has lateral coaxial holes 116a 116b held in transverse alignment with the bore 115. The fork shaft 11 has opposite recesses 141, 142 opening toward the lateral holes 116a, 116b, respectively. The fork shaft 11 also has a lateral through hole 143 that can be brought into substantial axial alignment with the holes 116a, 116b when the fork shaft 11 is in the four-wheel drive position D4. A pin 117 serving as a first switch actuator is slidably fitted in the hole 143, and a ball 20 serving as a second switch actuator is slidably fitted in the hole 116b.

A second fork shaft 12 has first and second flat steps 151, 152 on a surface thereof facing the hole 116b, the steps 151, 152 being interconnected by slant surfaces 153, 153. The second step 152 will face the hole 116b when the fork shaft 12 is in the neutral position.

The switch mechanism is positioned as shown in FIG. 25 when the transfer gear unit is in the high-speed gear position in the two-wheel drive mode. The fork shaft 11 is in the two-wheel drive position D2, while the fork shaft 12 is in the high-speed gear position H. Since the pin 117 is out of alignment with the pusher rod 61, the switch 60 is inactivated.

When the fork shaft 11 is axially displaced from the position of FIG. 25 to the four-wheel drive position D4, the pin 117 is forced into the position between the pusher rod 61 and the ball 20, thereby pushing the pusher rod 61 to the left to turn on the switch 60.

When the fork shaft 12 is displaced into the neutral position N, the ball 20 is laterally moved into abutment against the second step 152, and the pusher rod 61 projects to allow the switch 60 to be turned off.

When the fork shaft 12 is further displaced into the low-speed gear position L, the ball 20 is raised onto the first step 151 to cause the pin 117 to push the pusher rod 61, whereupon the switch 60 is turned on.

Therefore, the switch 60 is turned on in response to coaction of the pin 117 and the ball 20 when the fork shaft 11 is in the four-wheel drive position D4 and the fork shaft 12 is in the high-speed gear position H or the low-speed gear position L.

The first step 151 on the fork shaft 12 may be dispensed with, and its outer peripheral surface may directly bear the ball 20 thereon. The recesses 141, 142 in the fork shaft 11 may also be dispensed with, and the hole 15 may have grooves such as those shown in FIGS. 23 and 24 for accommodating the ends of the pin 117.

Figure 26:
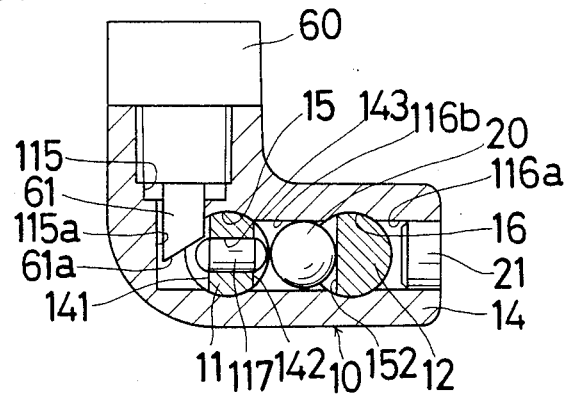
FIG. 26 is a cross-sectional view of a switch mechanism according to a modification of the switch mechanism shown in FIG. 25.

FIG. 26 shows a modification of the switch mechanism of FIG. 25. A switch 60 is attached to a casing 14 such that the switch 60 has an axis directed substantially perpendicularly to the axes of the holes 11a, 116b. The switch 60 has a pusher rod 61 having a slant surface 61a for camming engagement with the pin 117, the pusher rod 61 being accommodated in a bore 115a defined in the casing 14. The hole 116b is closed off by a plug 21.

Although certain preferred embodiments have been shown and described, it should be understood that many changes and modifications may be made therein without departing from the scope of the appended claims.

What is claimed is:

1. A transfer gear unit for use in an automobile, comprising:
   (a) a first changeover device for selecting one of a two-wheel drive mode and a four-wheel mode at a time;
   (b) a second changeover device for selecting one of a high-speed gear train, a neutral gear train and a low-speed gear train at a time;
   (c) a first fork shaft selectively movable into a two-wheel drive position and a four-wheel drive position for actuating said first changeover device;
   (d) a second fork shaft selectively movable into a high-speed gear position, a neutral gear position and a low-speed gear position for actuating said second changeover device; and
   (e) a switch mechanism for indicating the four-wheel drive mode, said switch mechanism including a switch and switch actuator means operable in response to operation of said first and second fork shafts for actuating said switch when said first fork shaft is in said four-wheel drive position and said second fork shaft is in said high-speed gear position or said low-speed gear position, wherein said switch actuator means comprises a ball for acting on said switch, said first fork shaft having a recess for retracting said ball away from said switch when said first fork shaft is in said two-wheel drive position, said second fork shaft having a recess for retracting said ball away from said switch when said second fork shaft is in said neutral gear position.

2. A transfer gear unit according to claim 1, including a casing having a hole, said first and second fork shafts being movably disposed in said casing, said ball being disposed in said hole, said hole having a lower bevelled edge for allowing said ball to move in said hole.

3. A transfer gear unit according to claim 1, including a spring disposed between said switch and said ball for normally urging said ball away from said switch toward said first and second fork shafts.

4. A transfer gear unit for use in an automobile, comprising:

(a) a first changeover device for selecting one of a two-wheel drive mode and a four-wheel drive mode at a time;

(b) a second changeover device for selecting one of a high-speed gear train, a neutral gear train and a low-speed gear train at a time.

(c) a first fork shaft selectively movable into a two-wheel drive position and a four-wheel drive position for actuating said first changeover device;

(d) a second fork shaft selectively movable into a high-speed gear position, a neutral gear position and a low-speed gear position for actuating said second changeover device; and (e) a switch mechanism for indicating the four-wheel drive mode, said switch mechanism including a switch and switch actuator means operable in response to operation of said first and second fork shafts for actuating said switch when said first fork shaft is in said four-wheel drive position and said second fork shaft is in said high-speed gear position or said low-speed gear position, wherein said switch actuator means comprises a pin for acting on said switch, said first fork shaft having a recess for retracting said pin away from said switch when said first fork shaft is in said two-wheel drive position, said second fork shaft having a recess for retracting said pin away from said switch when said second fork shaft is in said neutral gear position.

5. A transfer gear unit according to claim 4, including a second pin acting between the first-mentioned pin and said first fork shaft and a third pin acting between said first-mentioned pin and said second fork shaft.

6. A transfer gear unit for use in an automobile, comprising:

(a) a first changeover device for selecting one of a two-wheel drive mode and a four-wheel drive mode at a time;

(b) a second changeover device for selecting one of a high-speed gear train, a neutral gear train and a low-speed gear train at a time;

(c) a first fork shaft selectively movable into a two-wheel drive position and a four-wheel drive position for actuating said first changeover device;

(d) a second fork shaft selectively movable into a high-speed gear position, a neutral gear position and a low-speed gear position for actuating said second changeover device; and (e) a switch mechanism for indicating the four-wheel drive mode, said switch mechanism including a switch and switch actuator means including first and second switch actuators operable in response to operation of said first and second fork shafts for actuating said switch when said first fork shaft is in said four-wheel drive position and said second shaft is in said high-speed gear position or said low-speed gear position, wherein said first switch actuator comprises a ball, said first fork shaft having a recessed step for receiving said ball, said second switch actuator comprising two pins slidably supported on said second fork shaft and selectively displaceable for coacting with said ball to actuate said switch when said second fork shaft is in said high-speed gear position or/said low-speed gear position.

7. A transfer gear unit according to claim 6, further including another ball interposed between said second switch actuator and said switch for acting on said switch in response to displacement of said second switch actuator.

8. A transfer gear unit for use in an automobile, comprising:

(a) a first changeover device for selecting one of a two-wheel drive mode and a four-wheel drive mode at a time;

(b) a second changeover device for selecting one of a high-speed gear train, a neutral gear train and a low-speed gear train at a time;

(c) a first fork shaft selectively movable into a two-wheel drive position and a four-wheel drive position for actuating said first changeover device;

(d) a second fork shaft selectively movable into a high-speed gear position, a neutral gear position and a low-speed gear position for actuating said second changeover device; and (e) a switch mechanism for indicating the four-wheel drive mode, said switch mechanism including a switch and switch actuator means including first and second switch actuators operable in response to operation of said first and second fork shafts for actuating said switch when said first fork shaft is in said four-wheel drive position and said second fork shaft is in said high-speed gear position or said low-speed gear position, wherein said first switch actuator comprises a pin slidably supported on said first fork shaft, said second fork shaft having a recessed step, said second switch actuator comprising a ball receivable in said recessed step when said second fork shaft is in said neutral gear position.

* * * * *